July 21, 1964 D. ZEHEB 3,142,040

INFORMATION READING AND TRANSMITTING SYSTEM

Filed Jan. 31, 1961 2 Sheets-Sheet 1

INVENTOR.
DAVID ZEHEB
BY Blum, Moscovitz, Friedman & Blum
ATTORNEYS

INFORMATION READING AND TRANSMITTING SYSTEM

Filed Jan. 31, 1961

2 Sheets-Sheet 2

INVENTOR.
DAVID ZEHEB
BY Blum, Moscovitz, Friedman & Blum
ATTORNEYS

United States Patent Office 3,142,040

Patented July 21, 1964

3,142,040

INFORMATION READING AND TRANSMITTING SYSTEM

David Zeheb, 289 Ell Road, Hillsdale, N.J.

Filed Jan. 31, 1961, Ser. No. 86,114
1 Claim. (Cl. 340—146.3)

This invention relates to improved system for data processing and for automatically reading and transmitting information.

By way of example, and without limitation thereto, my system may be incorporated in the input unit of a high speed digital computer. While a computer is capable of high speed operation, the speed of its operation is limited by the speed with which input data can be converted into electrical impulses which may be supplied to the input unit of the computer.

It is convenient to reduce input data to typewritten or printed form on a page or pages of paper. Hence, one object of this invention is to provide means for automatically reading the typewritten or printed material and for automatically producing a signal in a particular electric circuit corresponding to the character being read. It will be readily apparent that the electric circuits may be connected to the computer input in any suitable manner, since the problem of automatically producing a pulse in a particular electric circuit corresponding to a particular character has been overcome by this invention.

Another object of this invention is to provide a page-reading system which can recognize a large set of characters including at least the numerals and the alphabet, which does not require the use of special ink, such as magnetizable ink, in forming the characters and which does not require optical or other scanning of the characters.

In one preferred embodiment of the invention, I provide a sensing member in the form of a rear conductive plate, and a selected number of photo-conductive areas of dot-like nature dispersed upon the front face of said plate in selected pattern. This sensing member can be placed in the desired sequence behind each of the characters upon the page which is being read. A light source is positioned in front of the page. The array and number of said photo-conductive areas and the shapes of the characters of the set used in preparing the message on the page are such that each character is adapted to block light from a unique pattern of said photo-conductive areas. I also provide a distinctive electric circuit corresponding to each of the characters of the set, said photo-conductive areas being distinctively connected in each of said circuits, each said electric circuit being electrically responsive only when the character corresponding thereto is receiving light.

By way of illustration, I have found that nine photo-conductive areas can be arranged in a pattern corresponding to a set of characters including, but not limited to, the twenty-six letters of the English alphabet and the ten numerals. Each of the characters blocks a different grouping of photo-conductive areas.

In accordance with the invention, sets of characters with differing type faces may be read merely by changing the sensing members, the electric circuitry remaining the same.

Other objects and advantages of the invention will become apparent from the following description, in accordance with the annexed drawing, in which preferred embodiments of the invention are disclosed.

Figure 1:
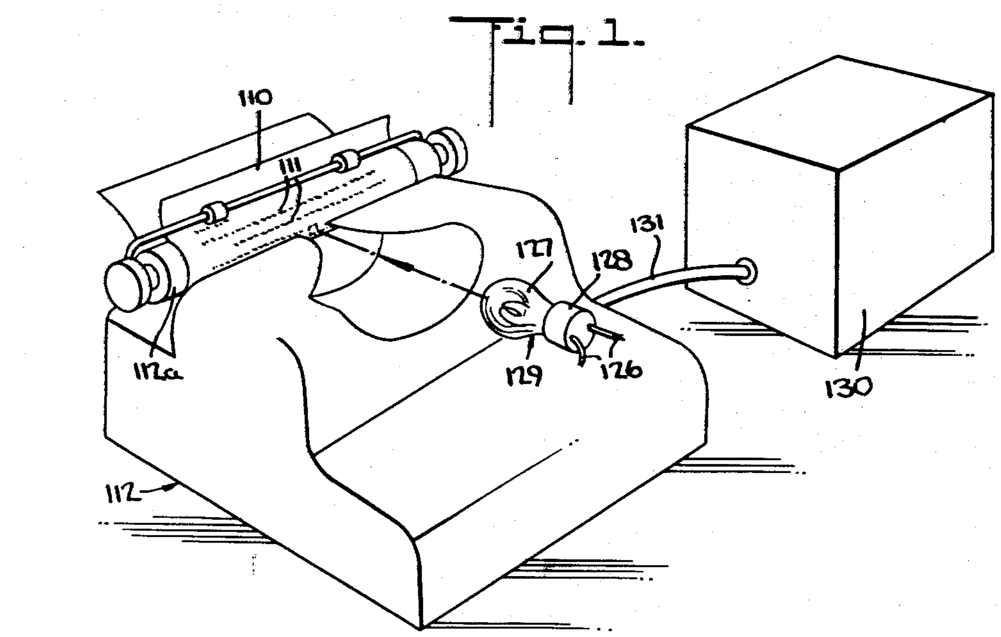
FIG. 1 is a perspective view of the apparatus in accordance with one preferred embodiment of the invention.

Referring to FIGS. 1–6 of the drawing, it will be noted that they show a sheet or page of paper 110 having character indicia 111 applied thereto, this sheet 110 being mounted in a transport mechanism 112. The drawing also shows a sensing member 120 which may be placed on transport mechanism 112 behind page 110, in registration with a character thereon, one such character "A" being illustratively shown in FIG. 2 in registration with sensing member 120. Light source 129 is located in front of page 110. FIG. 1 shows a casing 130 containing electric circuit element and connected by electric cable 131 to mechanism 112.

Sensing member 120 comprises rear conducting metal plate 121, which is grounded, intermediate photoconductive layer 122 and front opaque insulating masking layer 123 having a plurality of holes 124 which expose corresponding dot-like photo-conductive areas 125 on layer 123. Plate 121 is optionally rectangular. Photo-conductive layer 122 may be of known appropriate material, such as selenium, which may be further defined as being a material which is electrically insulating when in darkness but becomes conductive when light shines on it. Layer 122 may be deposited on base plate 121 by any suitable means. Masking layer 123 may be made of any appropriate material. The holes 124 are preferably preformed in layer 123, and it is applied to layer 122 by any suitable means.

The photo-conductive areas 125 over plate 121 may optionally be formed by any other suitable means.

Each area 125 is connected by a conductor 126 to a terminal 127 at the edge of sensing member 120. Preferably, the conductors 126 are printed on the front face of masking layer 123, and terminals 127 are printed or otherwise formed on said front face of layer 123.

By way of illustration, there are shown nine photo-conductive areas 125 in numbered sequence 1 . . . 9, and hence there are correspondingly nine terminals 127 in numbered sequence 1 . . . 9.

Transport mechanism 112 is optionally similar to a conventional electric typewriter and is not shown in detail. FIG. 1 shows the page 110 inserted in roller **112*a* in the usual manner, with the indicia or characters 111 on front face of page 110, as taken at the point at which the keys would ordinarily strike the paper. At this point, sensing member 120 is positioned, by any suitable means, between page 110 and roller 112*a***. The electric typewriter has certain circuit modifications, which will be discussed below.

Light source 129 is shown as comprising a base 126 having input leads **126*a* connected to any suitable voltage source (not shown). Base 128 receives lamp 127 in the usual manner. If necessary, light focusing means (not shown) may be provided. In any event, the light from source 129 travels longitudinally through the paper 110, which is light-transmitting, and hence onto sensing member 120**.

The character indicia 111 are in the form of a set of distinct characters each impressed upon the front of the paper by typing or printing. By way of illustration, and without limitation thereto, the set may consist of the numerals 1, 2, 3, 4, 5, 6, 7, 8, 9, and the capital letters A . . . Z. As the transport mechanism 112 is indexed, characters 111 successively register with sensing member 120. The array and number of photo-conductive areas 125 and the shape of the respective characters 111 are such that each character is adapted to block light from source 129 from reaching a unique pattern of photo-conductive areas 124.

Figures 2, 3, 4, 6:
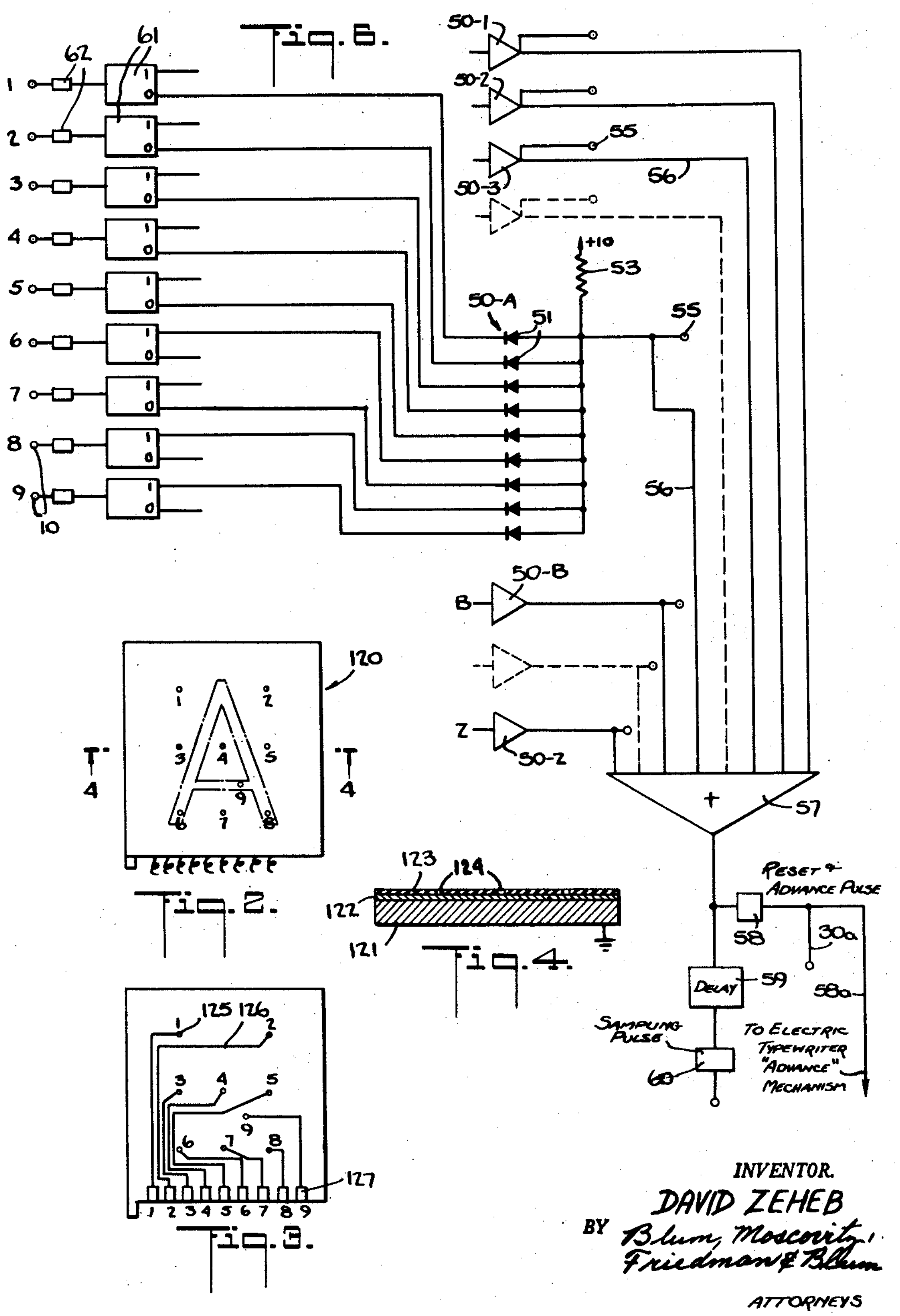
FIG. 2 is a front elevation of a first sensing member in accordance with the invention.
FIG. 3 is a schematic circuit diagram of the sensing member.
FIG. 4 is a section on line 4—4 of FIG. 2.
FIG. 6 is a schematic block diagram showing one of the "AND" circuits incorporating nine electric circuits as shown in FIG. 5 and corresponding to one of the characters being read, and also showing an "OR" circuit incorporating the "AND" circuits corresponding to all of the characters of the set.

FIG. 2 illustratively shows a letter "A" of the character set 111 in registration with sensing member 120. Said letter "A" blocks light from striking the 6, 8 and 9 photo-conductive areas 125. Light can strike the remaining six photo-conductive areas 125.

The following table shows which photo-conductive areas 125 are exposed (underlined) and which are blocked (no underlining) by each character of the illustrative set:

| Character: | Photoconductive areas |
|---|---|
| 1 | 1-2-3-4-5-6-7-8-9 |
| 2 | 1-2-3-4-5-6-7-8-9 |
| 3 | 1-2-3-4-5-6-7-8-9 |
| 4 | 1-2-3-4-5-6-7-8-9 |
| 5 | 1-2-3-4-5-6-7-8-9 |
| 6 | 1-2-3-4-5-6-7-8-9 |
| 7 | 1-2-3-4-5-6-7-8-9 |
| 8 | 1-2-3-4-5-6-7-8-9 |
| 9 | 1-2-3-4-5-6-7-8-9 |
| A | 1-2-3-4-5-6-7-8-9 |
| B | 1-2-3-4-5-6-7-8-9 |
| C | 1-2-3-4-5-6-7-8-9 |
| D | 1-2-3-4-5-6-7-8-9 |
| E | 1-2-3-4-5-6-7-8-9 |
| F | 1-2-3-4-5-6-7-8-9 |
| G | 1-2-3-4-5-6-7-8-9 |
| H | 1-2-3-4-5-6-7-8-9 |
| I | 1-2-3-4-5-6-7-8-9 |
| J | 1-2-3-4-5-6-7-8-9 |
| K | 1-2-3-4-5-6-7-8-9 |
| L | 1-2-3-4-5-6-7-8-9 |
| M | 1-2-3-4-5-6-7-8-9 |
| N | 1-2-3-4-5-6-7-8-9 |
| O | 1-2-3-4-5-6-7-8-9 |
| P | 1-2-3-4-5-6-7-8-9 |
| Q | 1-2-3-4-5-6-7-8-9 |
| R | 1-2-3-4-5-6-7-8-9 |
| S | 1-2-3-4-5-6-7-8-9 |
| T | 1-2-3-4-5-6-7-8-9 |
| U | 1-2-3-4-5-6-7-8-9 |
| V | 1-2-3-4-5-6-7-8-9 |
| W | 1-2-3-4-5-6-7-8-9 |
| X | 1-2-3-4-5-6-7-8-9 |
| Y | 1-2-3-4-5-6-7-8-9 |
| Z | 1-2-3-4-5-6-7-8-9 |

It will be apparent that additional characters can be added to the set, each having its unique pattern of photo-conductive areas which it blocks. Furthermore, for a different type font, the arrangement of the photo-conductive areas 125 may be varied. Also, special type fonts can be designed which are suitable for purposes of this invention.

I provide, in casing 130, a plurality of "AND" gates 50 each corresponding to one of the characters of set 111. Thus, for the illustrative set referred to above, there may be corresponding "AND" gates 50–1, 50–2 . . . 50–9, 50–A, 50–B . . . 50–Z. These circuits are shown diagrammatically in FIG. 6. As shown in detail for one of the "AND" gates, illustratively gate 50–A, each said gate 50 in turn comprises nine diodes 51 respectively connected to the appropriate outputs of nine flip-flop relays 61 (shown in block form in FIG. 6). Each flip-flop relay 61 is connected through a respective sensing circuit 62 (shown in block form in FIG. 6) to a terminal 10 which is adapted to be connected to a respective terminal 127 of sensing member 120. One of the respective sensing circuits 62 and flip-flop relays 61 is shown in detail in FIG. 5.

Put in other terms, each of the nine photo-conductive areas 125 is connected by its distinct electric circuit 62, 61 to each of the "AND" gates 50 corresponding to each character 111. These circuits 62, 61 are such that each "AND" gate 50 is actuated to produce an output signal only when the character responding thereto is in registration with sensing member 120.

Figures 5, 7:
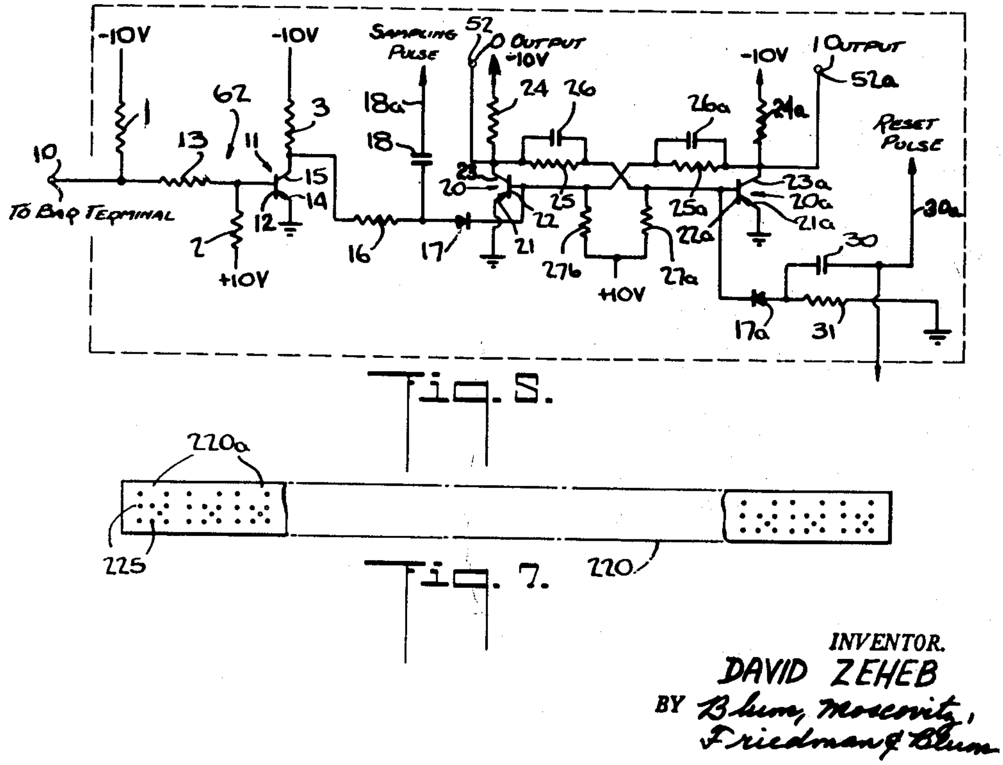
FIG. 5 is a schematic diagram of an electric circuit connected to one of the photo-conductive areas of the sensing member.
FIG. 7 is a front elevation of a modified sensing member.

In describing the specific sensing circuit shown in FIG. 5, it will be understood that the circuit values given are illustrative only. The connection between its input terminal 10 and sensing member terminal 127 is not shown. It will be understood that any suitable conductor may be extended through cable 131 between the two terminals. For practical purposes, terminal 10 is substantially at ground potential if the corresponding photo-conductive area 125 is not covered, or is "floating" if the photo-conductive area 125 is covered by the character 111 being read.

PNP transistor 11 has a base 12 which is connected to a positive source of 10 v. potential through a resistor 2 having a resistance of 10,000 ohms, and is connected to a minus ten volt source of potential through a resistance 13 of 2,000 ohms and a resistance 1 of 1,500 ohms. The point 10 is connected to the junction of the resistances 1 and 13.

In the case in which the point 10 is floating, then the base 12 is negative with respect to the grounded emitter 14 of transistor 11. As a result, the transistor conducts current, and the collector 15 is substantially at ground potential.

On the other hand, when the point 10 is effectively at ground potential, then the base 12 is positive with respect to the grounded emitter 14, and transistor 11 does not conduct electricity, so that collector 15, which is connected through 3,200 ohm resistor 3 to −10 v. potential, is at substantially −10 v. potential.

The collector 15 is connected through resistance 16 (15,000 ohms) to the plate of diode 17. In addition, the circuit for the sampling pulse is connected through line **18*a* and condenser 18 to the plate of diode 17. As will be explained below, a sampling pulse is fed to diode 17 while a given letter is being read. Said sampling pulse is fed simultaneously to the sensing circuits for all photo-conductive areas. If the letter covers the particular photo-conductive area, so that the corresponding transistor 11 conducts current, so that the plate of diode 17 is at ground potential, then the sampling pulse is conducted by diode 17 to the subsequent flip-flop relay 61 and actuates the flip-flop relay. On the other hand, if the area 125 in question is struck by light (not covered by the letter), so that the transistor 11 does not conduct, then the plate of diode 17** is at minus 10 volts potential, and the diode does not conduct electricity so that the flip-flop relay is not actuated by the sampling pulse.

Any suitable flip-flop relay may be used to follow the diode 17. In the particular embodiment illustratively shown, transistor 20 has an emitter 21 at ground potential, a base 22 connected to the cathode of diode 17 and a collector 23 connected through resistance 24 (1,000 ohms) to a −10 v. source of potential. Collector 23 is also connected to the zero output terminal 52 of the flip-flop relay.

Similarly, transistor 20*a* has its emitter 21*a* grounded, and its base 22*a* is connected to the cathode of diode 17*a*. The collector 23*a* of transistor 20*a* is connected to the 1 output terminal 52*a* and is also connected through resistance 24*a* to a −10 v. source of potential. Collector 23 is connected through resistance 25 and capacity 26 in parallel to base 22*a*. Collector 23*a* is connected through resistance 25*a* and capacity 26*a* in parallel to base 22. The two bases 22 and 22*a* are also respectively connected through resistances 27 and 27*a* to a plus ten volt source of potential.

The source of the reset pulse (see below) is connected through line 30*a* and capacitance 30 to the plate of diode 17*a*, this plate being further connected through resistance 31 to ground. All of the diodes 17*a* are supplied by the reset pulse source. Accordingly, one reset pulse may be used to reset all of the nine flip-flop relays of any one "AND" gate circuit, while a given sampling pulse will only serve to actuate the flip-flop relay of the particular sensing channels whose photo-conductive areas are connected to ground as the result of the fact that they are covered by the letter being read.

The operation of flip-flop relay 61 is conventional. Ordinarily, its output at 0 output terminal 52 is high (ground potential), while its output at 1 output terminal 52*a* is low (−10 v.). If the photoconductive area 125 corresponding to flip-flop relay 61 is covered by a character 111, then relay 61 is "flipped" when the circuit receives the sampling pulse so that its output at its 1 terminal 52*a* is high (ground potential), while its output at 0 output terminal 52 is low (−10 v.).

Each "AND" gate 50 includes nine diodes 51. Each diode 51 is connected to a terminal 52 or 52*a* of a respective flip-flop relay 61, the connection being to the terminal at which output is expected corresponding to the letter to which the gate is to respond. By way of example, for gate 50–A, the letter to which response is to be made is A. As stated above, the letter A covers the 6, 8 and 9 photoconductive areas 125. Accordingly, as shown in FIG. 6, the 1 terminals 52 of the 6, 8 and 9 flip-flop relays 61 are connected to the cathodes of the corresponding diodes 51. The 0 terminals 52*a* of the remaining flip-flop relays 61 are connected to the cathodes of the corresponding diodes 51.

The plates of the respective diodes 51 are all connected through resistance 53 to a plus 10 v. source of voltage. Accordingly, if the letter A is read, then the cathodes of all nine diodes 51 of "AND" gate 50–A are effectively at ground potential, and the plates are effectively at ground potential. Accordingly, there is a signal at the output terminal 55 which is connected to the plates of diodes 51. If a character other than A is read, at least the cathode of one diode 51 of "AND" gate 50–A remains at a potential of −10 v., and terminal 55 remains at −10 v.

Similarly, the connections of the cathodes of diodes 51 of each gate 50 to the flip-flop relays 61 thereof will be in accordance with the particular pattern of areas 125 covered or not covered by the character to which it is to respond. Accordingly, as each character is read, an output pulse is produced at terminal 55 of the corresponding "AND" gate. Terminals 55 may be connected in any desired way in the input of a digital computer or other device.

All of the outputs of the respective "AND" gates 50 are connected through lines 56 to "OR" gate 57. Accordingly, "OR" gate 57, which is conventional and hence no sthown in detail, produces an output signal whenever it receives an input signal from any one of the various "AND" gates 50, corresponding to the reading of a particular letter. The output of "OR" gate 57 is connected to circuit 58, and is also connected through time delay circuit 59 to circuit 60. Circuit 60 is a pulse generator of the sampling pulse which is supplied through lines 18*a* and condensers 18 to each of the flip-flop relays 61.

Circuit 58 consists of a pulse generator which generates the reset pulse supplied to each flip-flop relay 61 through line 30*a* and condenser 30, and also generates a pulse which is fed in any suitable manner through line 58*a* to the mechanism 112 to cause the keyboard to advance to the next character in the usual manner (not shown).

The operation of the system is simple and may be briefly summarized. The paper 110 is placed in mechanism 112 with the first character 111 to be read in registration with sensing member 120. An initial sampling pulse is supplied to the flip-flop relays by any suitable means (not shown). As a result, the "AND" gate 50 corresponding to the character being read is actuated, producing a pulse at its output terminal 55. Also, an output is then produced at "OR" gate 57, resulting in a reset pulse which resets all of the flip-flop relays and an advance pulse which causes the carriage of mechanism 112 to advance, thereby bringing the next character to be read into registration with sensing member 120. After a time delay (member 59), the next sampling pulse is automatically supplied to the flip-flop relays 61. The operation continues automatically until the last character on page 110 is read.

In the embodiment of FIG. 7, sensing member 220 is the width of a line of characters which is to be read. Member 220 is fabricated similarly to member 120 and has a series of regions 220*a* corresponding to the characters in the line to be read, each region 220*a* having an array of photo-conductive areas 225 like the photo-conductive areas 125. The advance pulse causes the light source 129 to be moved one space (as by means not shown), so that each character of the line is successively exposed to the light and read. At the end of the line, the light source returns to its initial position, and the next line to be read is moved, as the result of the advance pulse, into registration with member 220.

While I have disclosed a preferred embodiment of my invention, and have indicated various changes, omissions and additions which may be made therein, it will be apparent that various other changes, omissions and additions may be made in the invention without departing from the scope and spirit thereof.

What is claimed is:

Information recognition system comprising a set of indicia each in the form of a distinct character adapted to be impressed upon the front of light-transmitting insulating material so as to record selected information thereon, and recognition means for said indicia, said recognition means comprising a sensing member, said sensing member comprising a rear conducting plate and a selected number of photo-conductive areas of dot-like nature disposed upon the front face of said plate in selected pattern, said plate being adapted to be positioned behind said light-transmitting material in registration with a respective character, a light source in front of said light-transmitting material positioned and adapted to emit light for passage through said light-transmitting material and upon said sensing member, the array and number of said photo-conductive areas and the shape of the characters of said set being such that each character is adapted to block light from a unique pattern of said photo-conductive areas, an electric circuit corresponding to each of the characters of said set, said electric circuit comprising an "AND" gate having as many inputs as there are photo-conductive areas, a flip-flop relay corresponding to each "AND" gate input having a 0 output terminal and a 1 output terminal and having an input coupled to a respective photo-conductive area, and also adapted to receive a sampling pulse, said flip-flop relay being adapted upon reception of a sampling pulse to produce a high output at its 0 output terminal and low output at its 1 output terminal when its corresponding photo-conductive area is unblocked by a character and a reversal of output when its corresponding photo-conductive area is blocked by a character, respective output of each flip-flop relay being connected to a respective input of said "AND" gate in such a way that said "AND" gate produces an output only when the character corresponding thereto is receiving light, an "OR" gate having inputs each connected to the output of a respective "AND" gate, each said flip-flop relay having a further input for reception of a reset pulse and being thereby adapted to be restored to its initial condition, means coupled to the output of said "OR" gate for supplying said reset pulse to said reset input of said flip-flop relay, and means including time delay means coupling the output of said "OR" gate and said sampling pulse input of said flip-flop relay for supplying said sampling pulse thereto after said reset pulse is supplied thereto.

References Cited in the file of this patent

UNITED STATES PATENTS

| | | |
|---|---|---|
| 2,063,481 | Bryce | Dec. 8, 1936 |
| 2,682,043 | Fitch | June 22, 1954 |
| 2,723,308 | Vroom | Nov. 8, 1955 |